(12) United States Patent
Wang et al.

(10) Patent No.: US 9,998,944 B2
(45) Date of Patent: Jun. 12, 2018

(54) SYSTEM AND METHOD OF CHANNEL CONTROL IN A WIRELESS COMMUNICATION SYSTEM

(75) Inventors: Ping Wang, Beijing (CN); Jong-Kae Fwu, Sunnyvale, CA (US)

(73) Assignee: INTEL CORPORATION, Santa Clara, CA (US)

(*) Notice: Subject to any disclaimer, the term of this patent is extended or adjusted under 35 U.S.C. 154(b) by 1225 days.

(21) Appl. No.: 13/998,000

(22) PCT Filed: Sep. 28, 2011

(86) PCT No.: PCT/US2011/053688
§ 371 (c)(1),
(2), (4) Date: Feb. 24, 2014

(87) PCT Pub. No.: WO2012/148444
PCT Pub. Date: Nov. 1, 2012

(65) Prior Publication Data
US 2014/0161004 A1  Jun. 12, 2014

Related U.S. Application Data

(60) Provisional application No. 61/481,024, filed on Apr. 29, 2011.

(51) Int. Cl.
*H04W 28/02* (2009.01)
*H04W 52/02* (2009.01)
(Continued)

(52) U.S. Cl.
CPC ...... *H04W 28/0231* (2013.01); *H04B 7/0413* (2013.01); *H04B 7/0417* (2013.01);
(Continued)

(58) Field of Classification Search
CPC combination set(s) only.
See application file for complete search history.

(56) References Cited

U.S. PATENT DOCUMENTS 7,200,405 B2  4/2007  Rudolf et al.
8,391,911 B2  3/2013  Kishiyama et al.
(Continued)

OTHER PUBLICATIONS

Office Action and Search Report received for Chinese Patent Application No. 201180070493.0, dated Aug. 26, 2015, 6 pages (untranslated).
(Continued)

*Primary Examiner* — Yee Lam

(57) ABSTRACT

An apparatus may include a receiver arranged to wirelessly receive a downlink message allocating a set of component carriers and non-backward-compatible component carriers. The apparatus may include a processor and a control channel assignment module that is operable on the processor to determine timing for an acknowledgment message for responding to data transmitted in an uplink communication, and to locate a control channel resource for an acknowledgment message to data transmitted via a non-backward-compatible component carrier, the acknowledgement message to be carried by a component carrier. Other embodiments are disclosed and claimed.

13 Claims, 11 Drawing Sheets

(51) Int. Cl.
| | |
|---|---|
| H04W 72/04 | (2009.01) |
| H04W 48/06 | (2009.01) |
| H04N 21/2365 | (2011.01) |
| H04N 21/643 | (2011.01) |
| H04B 7/04 | (2017.01) |
| H04L 12/803 | (2013.01) |
| H04L 29/06 | (2006.01) |
| H04L 1/18 | (2006.01) |
| H04L 5/00 | (2006.01) |
| H04B 7/06 | (2006.01) |
| H04W 4/00 | (2018.01) |
| H04W 68/00 | (2009.01) |
| H04L 27/26 | (2006.01) |
| H04L 1/00 | (2006.01) |
| H04L 12/801 | (2013.01) |
| H04J 11/00 | (2006.01) |
| H04B 7/0413 | (2017.01) |
| H04B 7/0417 | (2017.01) |
| H04B 7/0452 | (2017.01) |
| H04W 72/12 | (2009.01) |
| H04W 88/06 | (2009.01) |
| H04W 36/14 | (2009.01) |
| H04W 84/12 | (2009.01) |
| H04W 88/10 | (2009.01) |

(52) U.S. Cl.
CPC ......... *H04B 7/0452* (2013.01); *H04B 7/0482* (2013.01); *H04B 7/0486* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0026* (2013.01); *H04L 5/0035* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 5/0092* (2013.01); *H04L 5/0094* (2013.01); *H04L 27/2602* (2013.01); *H04L 27/2613* (2013.01); *H04L 47/125* (2013.01); *H04L 47/14* (2013.01); *H04L 63/10* (2013.01); *H04L 65/4076* (2013.01); *H04N 21/2365* (2013.01); *H04N 21/64322* (2013.01); *H04W 4/005* (2013.01); *H04W 28/0268* (2013.01); *H04W 48/06* (2013.01); *H04W 52/0203* (2013.01); *H04W 52/0219* (2013.01); *H04W 68/005* (2013.01); *H04W 72/042* (2013.01); *H04W 72/0406* (2013.01); *H04W 72/0413* (2013.01); *H04W 72/1247* (2013.01); *H04B 7/0465* (2013.01); *H04B 7/0478* (2013.01); *H04B 7/0632* (2013.01); *H04W 36/14* (2013.01); *H04W 84/12* (2013.01); *H04W 88/06* (2013.01); *H04W 88/10* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/21* (2018.01); *Y02D 70/26* (2018.01); *Y02D 70/444* (2018.01)

(56) References Cited

U.S. PATENT DOCUMENTS

| | | | |
|---|---|---|---|
| 2011/0007673 A1* | 1/2011 | Ahn | H04L 1/1607 370/280 |
| 2011/0081913 A1* | 4/2011 | Lee | H04L 5/003 455/450 |
| 2011/0317645 A1* | 12/2011 | Jen | H04L 5/001 370/329 |
| 2012/0002631 A1 | 1/2012 | Nishio et al. | |
| 2013/0208587 A1* | 8/2013 | Bala | H04W 16/14 370/230 |
| 2013/0208645 A1* | 8/2013 | Feng | H04L 5/003 370/312 |
| 2014/0092840 A1* | 4/2014 | Zeng | H04L 1/1861 370/329 |
| 2014/0133371 A1* | 5/2014 | Park | H04L 5/001 370/280 |
| 2014/0204854 A1* | 7/2014 | Freda | H04L 1/18 370/329 |
| 2014/0269594 A1* | 9/2014 | Jang | H04L 5/0048 370/329 |
| 2014/0328332 A1* | 11/2014 | Yang | H04W 72/14 370/336 |
| 2015/0131536 A1* | 5/2015 | Kaur | H04L 5/001 370/329 |
| 2015/0256316 A1* | 9/2015 | Seo | H04L 1/1861 370/329 |

OTHER PUBLICATIONS

Extended European Search Report received for European Patent Application No. 11864360.0, dated Sep. 15, 2015, 7 pages.
Ericsson et al.,"On definitions of carrier types", 3GPP TSG RAN WG1 Meeting #59, R1-094436, Nov. 9-13, 2009, 5 pages.
"Further Details on PHICH for UL SU-MIMO", Texas Instruments, 3GPP TSG RAN WG1 #61, R1-102829, May 10-14, 2010, 2 pages, (author unknown).
International Search Report and Written Opinion, dated Feb. 23, 2012, Application No. PCT/US2011/053688, Filed Date: Sep. 28, 2011, pp. 9.
RI-070162, "E-UTRA Uplink L1/L2 Control Channel Mapping", 3GPP TSG RAN1 #47, Jan. 15-19, 2007.
RI-090656, "Uplink Control Channel Transmission for LTE-Advanced" 3gPP TSG RAN WG1 #56, Feb. 9-13, 2009.

* cited by examiner

Acknowledgment Message Timing Module

202

Uplink Data Monitoring Module

302

Downlink Timing Rule Module

SYSTEM AND METHOD OF CHANNEL CONTROL IN A WIRELESS COMMUNICATION SYSTEM

This application claims priority to U.S. provisional patent application Ser. No. 61/481,024, filed Apr. 29, 2011, and incorporated by reference herein in its entirety.

BACKGROUND

In wireless communications, the need to arrange communications efficiently continues to grow with the increasing number of mobile devices that in turn require increasing bandwidth to transmit an ever increasing amount of data. In order to provide adequate data throughput to and from an end user having a mobile user equipment (UE) device, it may be desirable to dynamically change the amount of bandwidth allocated to a UE. The 3GPP standard (LTE) ($3^{rd}$ Generation Partnership Project, Technical Specification Group Radio Access Network; Evolved Universal Terrestrial Radio Access (E-UTRA); (release 10), 06-2011) has developed a set of standards for assigning one or more component carriers to transmit data and control signals. Each component carrier spans a frequency block within a larger band that may be assigned for communications between the UE and another device, such as a base station within a cell. In many scenarios, multiple component carriers may be allocated to a UE for communicating data and/or control signals between the UE and base station.

As specified in the LTE-A standard, which is an evolution of the 3GPP LTE standard, each carrier is a component carrier that is able to transmit data, control signals, and control channel information. In particular, each component carrier can include a Physical Hybrid-ARQ Indicator Channel (PHICH) that acts as a transmission channel for information that confirms or requests the retransmission of blocks of data that are incorrectly received by the receiving device. Thus, the quality of data sent over any component carrier can be ascertained using a channel within that component carrier.

However, it is anticipated that in future LTE standards (beyond LTE Release 10), extra carriers (non-backward-compatible component carriers) may be defined that function primarily to transmit data, but may not include the full control functionality as specified for component carriers. It is with respect to these and other considerations that the present improvements have been needed.

BRIEF DESCRIPTION OF THE DRAWINGS

FIG. 3 depicts an embodiment of the acknowledgement message timing module.

DETAILED DESCRIPTION

Various embodiments are directed to wireless communications where allotted carriers include component carriers and non-backward-compatible component carriers. The term "component carrier" as used herein without a modifying prefix, refers to component carriers that are able to carry control information such as PHICH and are backwardly compatible with LTE Rel-8/9/10 component carriers. The term "non-backward-compatible component carriers" refers to various different types of carriers which may not be fully backward compatible to the LTE Rel-8/9/10 component carriers, including extension carriers, carrier segments, etc. Embodiments may particularly provide for transmission of control messages in systems that include non-backward-compatible component carriers. In particular, in future releases of the LTE standard, so-called non-backward-compatible component carriers may be defined for predominantly data transmission between a UE and base station (also referred to herein as eNodeB, or eNB). Such non-backward-compatible component carriers may therefore not support channels such as PHICH.

Embodiments address the mechanism by which control information pertinent to the non-backward-compatible component carriers is managed. For example, the use of non-backward-compatible component carriers may not be backward compatible with 3GPP Rel-8/9/10 technical standards that employ component carriers only. Moreover, if the non-backward-compatible component carriers do not include control channels to transmit in a downlink message acknowledgment/non-acknowledgement (ACK/NAK) information such as hybrid automatic repeat request (HARQ), future standards may require another mechanism to transmit ACK/NAK information of an uplink non-backward-compatible component carrier. As set forth below, various embodiments present systems and methods for assigning a downlink control channel resource for a carrier to acknowledge an uplink message from that carrier when no downlink control channel is available within the carrier. In this manner, data throughput may be increased in an efficient manner by minimizing overhead that accompanies channels such as control channels.

Figure 1:
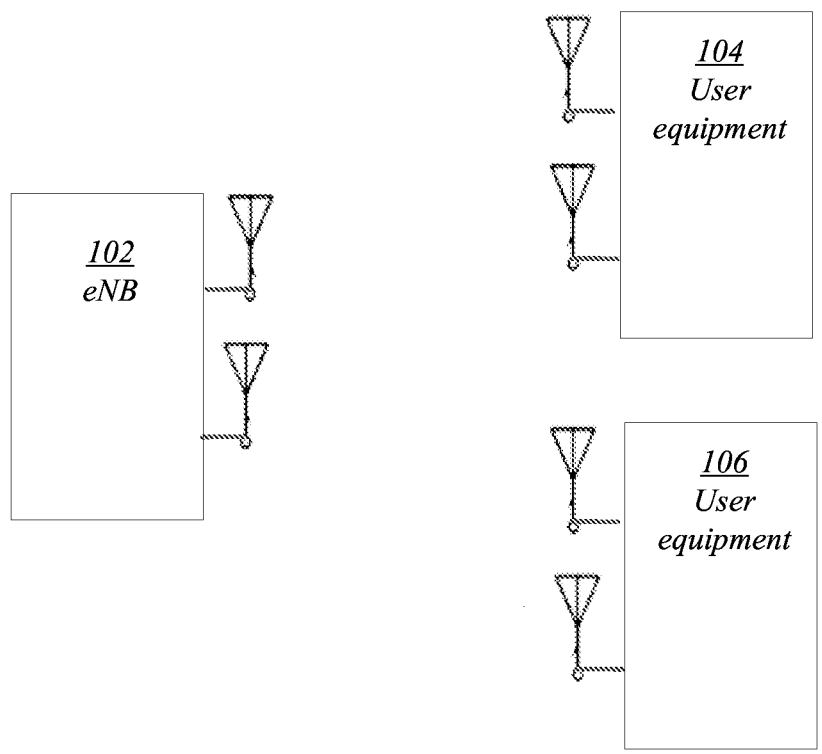
FIG. 1 illustrates one embodiment of a communications system.

FIG. 1 illustrates a block diagram of one embodiment of a system 100 that includes a base station (eNodeB, or eNB) 102 and UE terminals (or "UE") 104, 106. In various embodiments, the UE terminals 104, 106 may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

Some embodiments of a communications system may be implemented with a radio technology such as LTE-advance (LTE-A), which is an evolution of the 3GPP LTE. 3rd generation partnership project (3GPP) long term evolution (LTE) is a part of an evolved UMTS (E-UMTS) using the E-UTRA. The UTRA is a part of a universal mobile telecommunication system (UMTS).

In LTE-A systems, service providers are assigned one or more component carriers (CCs) for supporting wireless communication over the air interface. Each component carrier is centered on a particular frequency and has a predetermined bandwidth. For example, the bandwidth numerology of LTE currently specifies that the component carriers may have bandwidths of 1.4 MHz, 3 MHz, 5 MHz, 10 MHz, 15 MHz, and 20 MHz that support 6, 15, 25, 50, 75, and 100 physical resource blocks (PRB), respectively.

In accordance with LTE standard, each eNB 102 may assign PRBs to each UE 104, 106 that span a fixed amount of sub-carriers for a given time. For example, a PRB may span 12 sub-carriers in frequency by 6 symbols for the extended cyclic prefix (CP) or 7 symbols for the normal cyclic prefix (CP) in each time slot.

In various embodiments PRBs are assigned to a UE to facilitate transmission of control information in a downlink communications from the eNB. In particular, the PRBs may be assigned over a component carrier in a downlink that is arranged to carry acknowledgement (ACK)/non-acknowledgement (NAK) messages for uplink data transmitted over either a component carrier or non-backward-compatible component, so that the UE can be apprised of receipt of non-backward-compatible component carrier uplink messages when the non-backward-compatible component carrier is not arranged for transmitting downlink signals such as PHICH.

Figure 2:
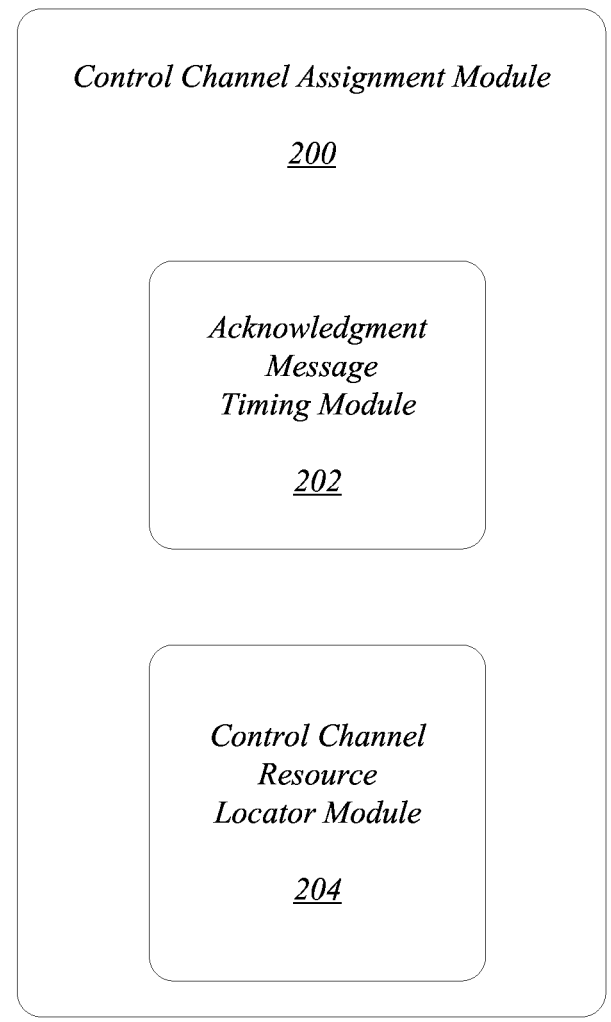
FIG. 2 depicts a control channel assignment module consistent with various embodiments.

FIG. 2 depicts a control channel assignment module 200 consistent with various embodiments. The control channel assignment module 200 may be employed to schedule transmission of control signals, such as HARQ ACK/NAK carried in a PHICH, for arrangements where a UE is assigned a carrier that exclusively or predominantly carries data. In some embodiments, the eNB may schedule a component carrier and non-backward-compatible component carrier to a given UE for transmission of data. The aggregation of a component carrier and non-backward-compatible component carrier may increase the bandwidth and therefore the efficiency of a system. However, in conventional arrangements when uplink data is transmitted from the UE 104 via a non-backward-compatible component carrier to the eNB, the standard may specify that the non-backward-compatible component carrier is not to transmit control channel information, thereby precluding the eNB 102 from sending an acknowledgment/non-acknowledgement to the UE 104. Thus, the UE 104 may therefore not be able to confirm successful reception of data at the eNB 102.

In order to address this problem, the control channel assignment module 200 may assign a PHICH transmitted over a component carrier for returning an acknowledgment message to the UE regarding data transmitted over the non-backward-compatible component carrier. As noted, this acknowledgment may be a HARQ ACK/NAK message that provides an acknowledgment as to whether or not the data transmission from the non-backward-compatible component carrier was successfully received. As illustrated, the control channel assignment module 200 may include an acknowledgement message timing module 202, and a control channel resource locator module 204.

As discussed further below with respect to FIG. 3, the acknowledgment message timing module 202 to may determine the subframe timing for scanning for a downlink acknowledgment message based on transmission of uplink data over a non-backward-compatible component carrier and/or component carrier.

The control channel resource locator module 204, whose operation is detailed below with respect to FIGS. 4-6, may be employed to locate a control channel resource in a component carrier that provides an acknowledgement message in response to the uplink data transmission.

FIG. 3 depicts an embodiment of the acknowledgement message timing module 202 including an uplink data monitoring module 302, which may monitor uplink transmissions and determine a subframe when uplink data is transmitted. The acknowledgement message timing module 202 also includes a downlink timing rule module 304 for applying timing rules to determine a downlink subframe that contains an acknowledgment message based upon the uplink subframe used to transmit the data.

As noted, the control channel assignment module 200 may be used in various embodiments to coordinate data transmissions between the UE and eNB during periods of operation of the UE when both a component carrier(s) and non-backward-compatible component carrier(s) are allocated to the UE. In some embodiments, the acknowledgement message timing module 202 may determine a downlink subframe on which a HARQ ACK/NAK message is to be transmitted for a given uplink data transmission carried over a physical uplink shared channel (PUSCH) or similar channel for transmitting data. This may involve determining when a data transmission over a non-backward-compatible component carrier PUSCH takes place, and scheduling scanning of a downlink subframe for a HARQ ACK/NAK accordingly.

In various embodiments the acknowledgement message timing module 202 may determine a downlink sub-frame according to procedures of a known standard, such as LTE-A. Accordingly, consistent with some embodiments, the uplink data monitoring module 302 and downlink timing rule module 304 may operate as detailed below in a manner set forth in the physical layer procedures technical specification, 3GPP TS 36.213 section 9.1.2 ($3^{rd}$ Generation Partnership Project, Technical Specification Group Radio Access Network; Evolved Universal Terrestrial Radio Access (E-UTRA); physical layer procedures, (release 10), 06-2011).

For LTE frequency division duplex (FDD) communications, if an uplink channel transmission of data from UE to eNB of a serving cell c is scheduled over a physical uplink shared channel (PUSCH) during a subframe n, a corresponding PHICH resource may be located in sub-frame n+4. For LTE time division duplex (TDD) communications, the corresponding PHICH resource for an uplink data transmission during subframe n may be located in sub-frame $n+k_{PHICH}$, where $k_{PHICH}$ is given in table I.

TABLE I $k_{PHICH}$ for TDD

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |

TABLE I-continued $k_{PHICH}$ for TDD

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 3 | | | | 6 | 6 | 6 | | | | |
| 4 | | | | 6 | 6 | | | | | |
| 5 | | | | 6 | | | | | | |
| 6 | | | 4 | 6 | 6 | | | 4 | 7 | |

Thus, once the uplink data monitoring module 302 determines that a PUSCH or similar data transmission takes place, for example, via a non-backward-compatible component carrier, the downlink timing rule module 304 may determine the subframe that includes the HARQ ACK/NAK that is carried in a component carrier and is sent in response to the data transmission.

Figure 4:
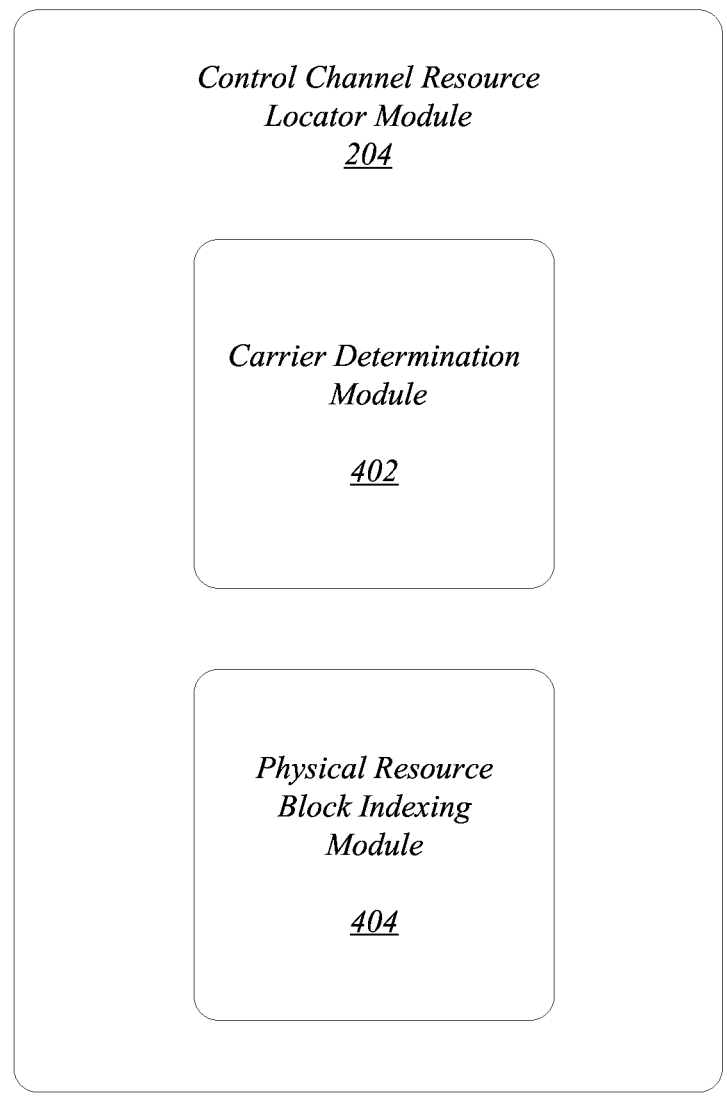
FIG. 4 depicts an embodiment of a control channel resource locator module.

FIG. 4 depicts an embodiment of a control channel resource locator module 204 that includes carrier determination module 402 and physical resource block (PRB) indexing module 404. The carrier determination module 402 may determine the current carrier associated with an uplink data transmission and may accordingly adjust operation of the physical resource block indexing module 404 as detailed below with respect to FIGS. 5 and 6. For example, once the type of carrier associated with a PUSCH data transmission is determined, the search to locate a PHICH resource carrying an acknowledgment message of the PUSCH data transmission may be adjusted.

In various embodiments, the control channel resource locator module 204 may operate to identify a PHICH resource for a non-backward-compatible component carrier by modifying the procedures set forth in 3GPP TS 36.213.9.1.2 for identifying a PHICH resource. Such procedures as defined in the unmodified 3GPP TS 36.213.9.1.2 may be applied when only a component carrier that supports a PHICH on a downlink transmission is involved in data transmission, for example.

In particular, in various embodiments, the PHICH resource may be identified by an index pair $n_{PHICH}^{group}$, $n_{PHICH}^{seq}$) where $n_{PHICH}^{group}$ is the PHICH group number and $n_{PHICH}^{seq}$ is the orthogonal sequence index within the group as defined by Eqs. (1) and (2) below. In accordance with the present embodiments, save for the term $Ic_{PRB\_RA}$, the terms set forth in Eqs. (1) and (2) conform to those provided in the 3GPP TS standard as detailed below. The term $Ic_{PRB\_RA}$ refers to the physical resource block index of a corresponding PUSCH transmission used to carry, for example, data sent from a UE over a component carrier or a non-backward-compatible component carrier. The scope and function of the term $Ic_{PRB\_RA}$ will be elaborated upon in the discussion to follow.

The PHICH group number $n_{PHICH}^{group}$ and the orthogonal sequence index within the group $n_{PHICH}^{seq}$ may be defined as follows:

$$n_{PHICH}^{group} = (Ic_{PRB\_RA} + n_{DMRS}) \bmod N_{PHICH}^{group} + I_{PHICH} N_{PHICH}^{group} \quad (1); \text{ and}$$

$$n_{PHICH}^{seq} = (\lfloor Ic_{PRB\_RA}/N_{PHICH}^{group} \rfloor + n_{DMRS}) \bmod 2N_{SF}^{PHICH} \quad (2)$$

where $n_{DMRS}$ is mapped from the cyclic shift for DMRS (demodulation reference signal) field (see Table II.) in the most recent PDCCH (physical downlink control channel) with uplink DCI format (3GPP TS 36.212: "Evolved Universal Terrestrial Radio Access (E-UTRA); Multiplexing and channel coding" [4]) for the transport block(s) associated with the corresponding PUSCH (physical uplink shared channel) transmission.

TABLE II

| Cyclic Shift for DMRS Field in PDCCH with uplink DCI format in [4] | $H_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

The term $n_{DMRS}$ becomes zero if there is no PDCCH with uplink DCI format for the same transport block, and if either the initial PUSCH for the same transport block is semi-persistently scheduled, or the initial PUSCH for the same transport block is scheduled by the random access response grant.

The term $N_{SF}^{PHICH}$ is the spreading factor size used for PHICH modulation as described in 3GPP TS 36.211 (Physical channels and modulation, section 6.9.1). In particular:

$$N_{SF}^{PHICH} = \begin{cases} 4 & \text{for normal cyclic prefix} \\ 2 & \text{for extended cyclic prefix} \end{cases}.$$

The term $N_{PHICH}^{group}$ represents the number of PHICH groups configured by higher layers as described in 3GPP TS 36.211 section 6.9. In particular, for frame structure type 1, the number of PHICH groups $N_{PHICH}^{group}$ is constant in all subframes and given by $$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad (3)$$

where $N_g \in \{1/6, 1/2, 1, 2\}$ is provided by higher layers. The index $n_{PHICH}^{group}$ ranges from 0 to $N_{PHICH}^{group} - 1$.

For frame structure type 2, the number of PHICH groups may vary between downlink subframes and is given by $m_i \cdot N_{PHICH}^{group}$ where $m_i$ is given by Table III, and $N_{PHICH}^{group}$ by Eq. (3). The index $n_{PHICH}^{group}$ in a downlink subframe with non-zero PHICH resources ranges from 0 to $m_i \cdot N_{PHICH}^{group} - 1$.

TABLE III

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

The term $I_{PHICH}$ is given by:

$$I_{PHICH} = \begin{cases} 1 & \text{for TDD UL/DL configuration 0 with PUSCH} \\ & \text{transmission in subframe } n = 4 \text{ or } 9 \\ 0 & \text{otherwise} \end{cases} \quad (4)$$

In accordance with the present embodiments, the term $IC_{PRB\_RA}$ is determined as set forth in Eqs. (5) and (6):

$$I_{c,PRB\_RA} = \begin{cases} I_{c,PRB\_RA}^{lowest\_index} + \sum_{c=1}^{C} N_{c-1,RB}^{UL} & (5) \\ I_{c,PRB\_RA}^{lowest\_index} + 1 + \sum_{c=1}^{C} N_{c-1,RB}^{UL} & (6) \end{cases}$$

The Eq. (5) applies for the case of a first transmission block (TB) of a PUSCH with associated PDCCH, or for the case of no associated PDCCH when the number of negatively acknowledged TBs is not equal to the number of TBs indicated in the most recent PDCCH associated with the corresponding PUSCH of the $c^{th}$ carrier. The Eq. (6) applies for a second TB of a PUSCH with associated PDCCH on the $c^{th}$ carrier.

Consistent with various embodiments a PRB is indexed according to:

$$I_{c,PRB\_RA}^{lowest\_index},$$

which is the lowest PRB index in the first slot of the corresponding PUSCH transmission on the $c^{th}$ carrier ("lowest extended PRB index"), while the maximum number of uplink RBs on the cth carrier is given by: $N_{c-1,RB}^{UL}$. The lowest extended PRB index may be considered to be a modification of a "lowest PRB index" expressed as $I_{PRB\_RA}^{lowest\_index}$, which may be used in the case of a component carrier-only uplink transmission.

In the above indexing scheme set forth in Eqs. (5) and (6), both component carriers and non-backward-compatible component carriers are accounted for by the parameter C, which represents the total number of all component carriers and non-backward-compatible component carriers. In addition, the first carrier is assigned to a component carrier and a zero value is assigned to the initial term in the sequence, $N_{0,RB}^{UL}$ For PRBs that are carried by a component carrier, the PRB index module 402 may assign numbering of the resource blocks as illustrated in FIG. 5. In particular, FIG. 5 depicts an embodiment of mapping physical resource blocks associated with an uplink transmission that supports both component carrier and non-backward-compatible component carriers. In the arrangement 500 of FIG. 5, one component carrier 502 and one non-backward-compatible component carrier 504 are shown. In one embodiment, the component carrier 502 may occupy a frequency range that is non-contiguous with the frequency range occupied by non-backward-compatible component carrier 504. However, in other embodiments, the component carrier and non-backward-compatible component carrier may span contiguous frequency ranges. The component carrier may in general include a different number of resource blocks 506 than are contained in non-backward-compatible component carrier 508.

Figure 5:
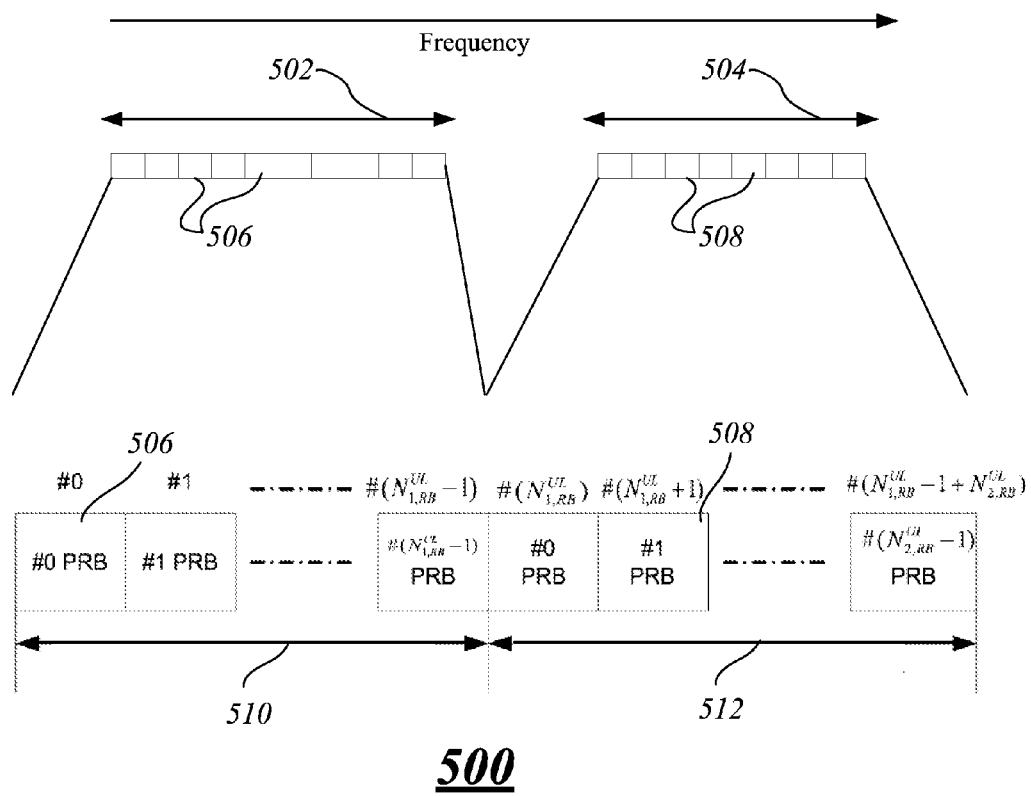
FIG. 5 depicts an embodiment of mapping physical resource blocks associated with an uplink transmission.

As further illustrated in FIG. 5, the PRBs may be mapped into a sequence beginning with "0" for the first resource block in the component carrier 502. In particular the physical resource blocks 506 are numbered in a first sequence 510 from 0 to $(N_{1,RB}^{UL}-1)$ and the physical resource blocks 508 of the uplink non-backward-compatible component carrier are numbered to succeed the last entry of the sequence 510, so that they form a second sequence 512 contiguous in numbering to the first sequence. Thus, the PRBs form a sequence 512 that begins at an entry $(N_{1,RB}^{UL})$ and ends with the entry $(N_{2,RB}^{UL}-1)$.

In accordance with the above mapping process, a PHICH resource for a non-component carrier can be specified by changing the range of lowest PRB index from a range given by [0, $N_{RB}^{UL}-1$] for only component carriers to an extended range that may include multiple carriers and may be generally represented by the expression $$\left[0, \left(\sum_{c=1}^{C} N_{c,RB}^{UL}\right) - 1\right].$$

As is evident from the above expression, the lowest PRB index used in conjunction with an uplink transmission such as PUSCH, may be used for different combinations of component carriers and non-backward-compatible component carriers, where the total number of carriers is equal to C. Moreover, the number of PRBs may vary between different carriers c.

Figure 6:
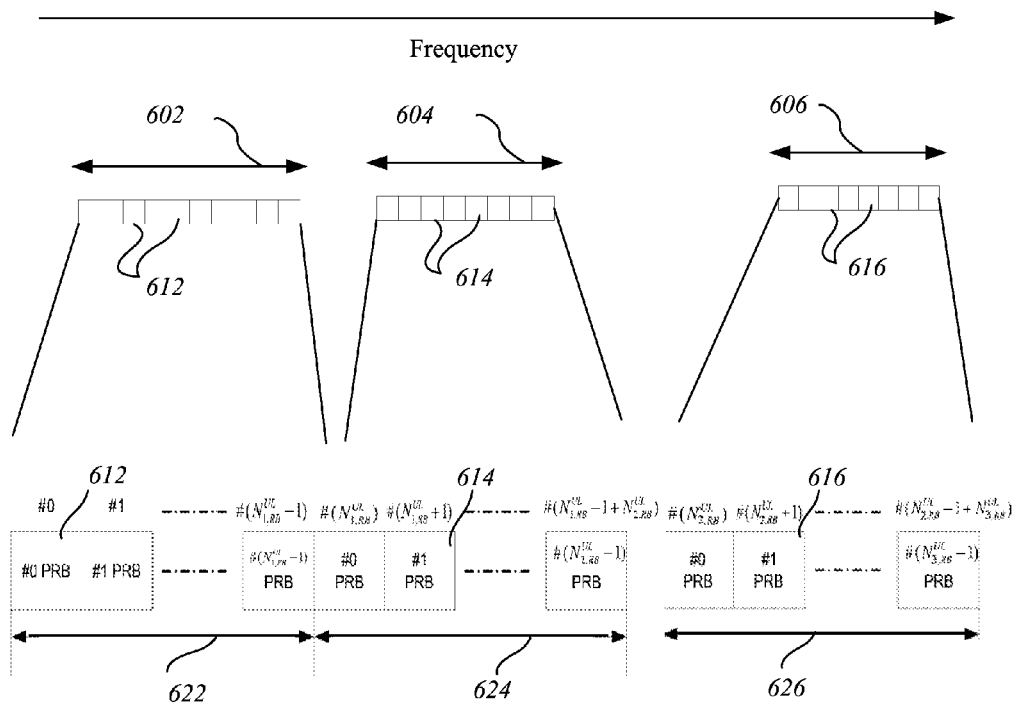
FIG. 6 depicts another embodiment of indexing multiple carriers.

FIG. 6 depicts another embodiment of indexing multiple carriers 602, 604, 606. In FIG. 6, a component carrier 602 is depicted spanning a first frequency range, while carriers 604 and 606 span second and third frequency ranges, respectively. In various embodiments, one or more of the carriers 604, 606 may be non-backward-compatible component carriers. The scenario depicted in FIG. 6 may arise in the following manner. Referring also to FIG. 2, upon power up, a UE 104 may perform routine operations such as searching for a synchronization channel. The eNB 102 may send a message to the UE containing instructions regarding attaching to a network and may provide an ID that allocates a component carrier 602 for communications. A transmission sent from UE 102 may subsequently be acknowledged using PHICH allocated to the downlink for component carrier 602. The eNB 102 may subsequently determine to allocate an additional carrier 604 to UE 104 and may indicate in a control message to UE 104 how to camp onto the carrier 604. A similar procedure may take place that allocates the carrier 606 for communications between eNB 102 and the UE 104.

In one scenario where carriers 604 and 606 are both non-backward-compatible component carriers that are not backwardly compatible, PHICH communications may be unavailable via carriers 604 and 606. Accordingly, when data is transmitted on a PUSCH uplink communication via either carrier 604 or carrier 606, the eNB 102 may schedule HARQ ACK/NAK messages in response to PUSCH data via a PHICH of component carrier 602. The arrangement in FIG. 6 provides one example of an indexing that facilitates identification of a PHICH resource for either carrier 604 of carrier 606. As illustrated in FIG. 6, the uplink physical resource blocks 612 corresponding to component carrier 602 may be numbered in a sequence 622 from 0 to $(N_{1,RB}^{UL}-1)$. The physical uplink resource blocks 614 for carrier 604 are numbered in a sequence 624 to succeed the last entry of the sequence 622 so that the sequence 624 begins at entry $(N_{1,RB}^{UL})$ and ends with the entry $(N_{2,RB}^{UL}-1)$. The physical uplink resource blocks 616 for carrier 606 are numbered in a sequence 626 to succeed the last entry of the sequence 624 so that the sequence 626 begins at entry ($N_{2,RB}^{UL}$) and ends with the entry ($N_{3,RB}^{UL}$).

In accordance with the arrangement of FIG. 6, when an uplink data transmission over PUSCH takes place via either carrier 604 or 606, the downlink PHICH may be scheduled according to the procedure set forth above. Namely, for FDD communications, when the PUSCH uplink channel transmission of data from UE 104 to eNB 102 takes place over a subframe n, the PHICH resource may be located in sub-frame n+4. For time division duplex (TDD) communications, the corresponding PHICH for an uplink data transmission during subframe n may be scheduled in the subframe as specified in Table I. The location of the PHICH resource that carries a HARQ ACK/NAK message in response to the PUSCH uplink transmission of data may then be determined as provided in the indexing scheme illustrated in FIG. 6.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
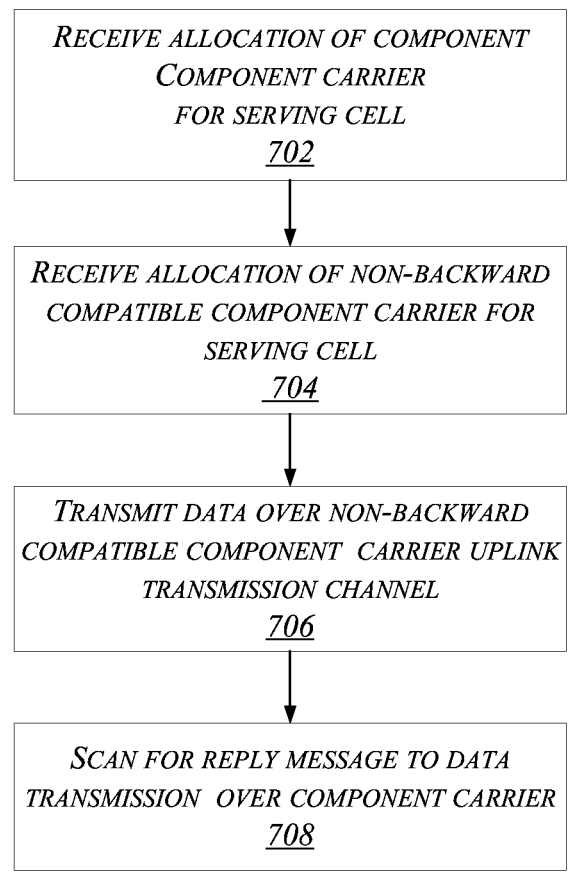
FIG. 7 illustrates an exemplary logic flow consistent with some embodiments.

FIG. 7 illustrates an exemplary logic flow 700. At block 702 an allocation of a component carrier is received for a given serving cell. In some embodiments a UE may receive an allocation of more than one component carrier.

At block 704 an allocation of a non-backward-compatible component carrier is received by the UE that allocates the component carrier or carriers in block 702. In one embodiment, a base station (eNB) may assign a non-backward-compatible component carrier to a UE after the assignment of one or more component carriers. In some embodiments, more than one non-backward-compatible component carrier may be assigned for a UE in addition to one or more component carriers.

At block 706, data is transmitted by a UE over an uplink via a non-backward-compatible component carrier as assigned to the UE at block 704. In various embodiments, the data may be transmitted over a PUSCH in accordance with the standards set forth in 3GPP TS 36.213.

At block 708, a reply message is received to the uplink data transmission that was sent over the non-backward-compatible component carrier. In some embodiments, the reply message may be a hybrid automatic repeat request message that confirms receipt of the data transmitted from the UE over the PUSCH in the non-backward-compatible component carrier at block 706. In particular, the reply message is scanned for over a component carrier assigned to the UE transmitting the uplink data over the non-backward-compatible component carrier, since that non-backward-compatible component carrier may not be capable of transmitting the reply message.

Figure 8:
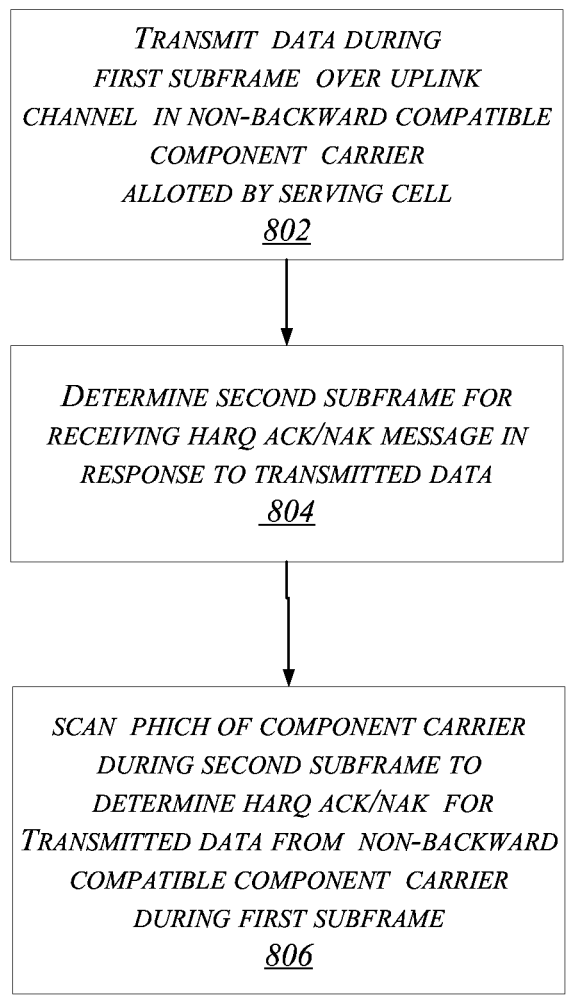
FIG. 8 depicts another logic flow consistent with further embodiments.

FIG. 8 depicts another logic flow 800 consistent with further embodiments. At block 802, data is transmitted from a UE during a first subframe over an uplink channel in a non-backward-compatible component carrier allotted to the UE by a serving cell. The data may be transmitted over a channel such as a PUSCH. In various embodiments, the UE may employ a time division duplex (TDD) or frequency division duplex (FDD) communications frame for transmitting the data.

At block 804, a second subframe is determined for which to receive an acknowledgement message such as HARQ ACK/NAK. The second sub-frame may be determined based on rules for scheduling a HARQ ACK/NAK message in a component carrier based on an earlier uplink transmission.

At block 806, the UE that transmitted the data during the first subframe scans a control channel such as a PHICH of a component carrier during the second subframe. The control channel of the component carrier may be scanned to determine the HARQ ACK/NAK for the data transmitted by the UE over the non-backward-compatible component carrier during the first subframe since the UE knows that the non-backward-compatible component carrier is not arranged to support a PHICH.

Figure 9:
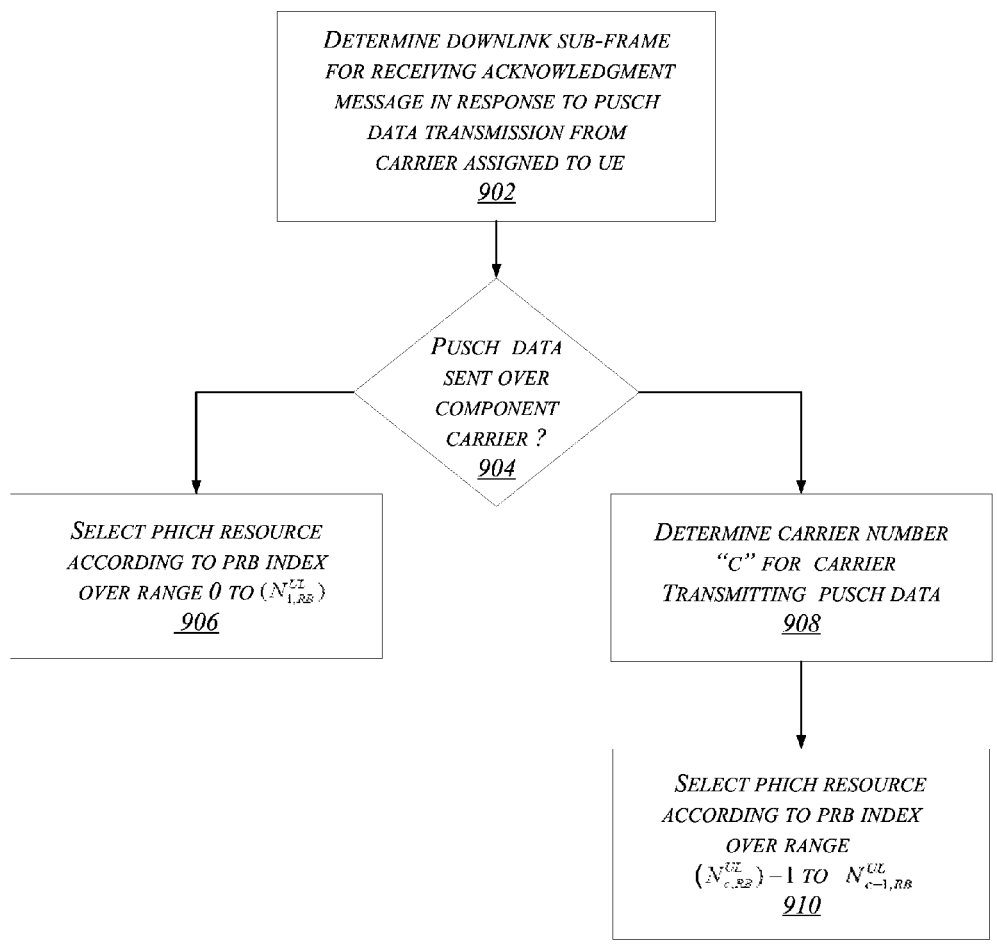
FIG. 9 depicts still another logic flow consistent with further embodiments.

FIG. 9 depicts still another logic flow 900 consistent with further embodiments. At block 902, a downlink sub-frame is determined for receiving an acknowledgement message in response to data transmitted over a PUSCH via a carrier assigned to a UE. Consistent with various embodiments, the downlink subframe may be determined according to the type of communications structure employed by the UE. For example, the downlink subframe may be determined according to standards set forth in 3GPP TS 36.213 and as detailed above in Table I.

At block 904, it is determined whether the data transmitted over the uplink transmission (PUSCH) was transmitted by a component carrier that is designed to support a PHICH in downlink communications.

If, at block 904, it is determined that the data was transmitted over a component carrier the flow moves to block 906. At block 906, a PHICH resource is selected for receiving an acknowledgment message to the data transmitted over the uplink transmission. In particular, the PHICH resource is selected based upon an indexing of physical resource blocks corresponding to different channels of the downlink component carrier. The indexing may be based upon known schemes and may span a range from zero to ($N_{1,RB}^{UL}$−1).

If, at block 904, it is determined that data was transmitted over a non-backward-compatible component carrier, such as an extension carrier, the flow moves to block 908. At block 908, a carrier number "c" is determined that corresponds to the carrier used to transmit the data over the PUSCH at block 902. For example, in a scenario in which an eNB schedules a single component carrier and two non-backward-compatible component carriers for a UE, the component carrier may be designated as carrier 1, a first non-backward-compatible component carrier may be designated as carrier 2, and second non-backward-compatible component carrier designated as carrier 3.

At block 910, a PHICH resource for the downlink subframe is selected according to a physical resource block index. The PRB index is arranged over a range ($N_{c,RB}^{UL}$)−1 to $N_{c-1,RB}^{UL}$. In this manner, an index may be determined in a downlink component carrier PHICH, where the index denotes a PRB associated with the acknowledgment message to transmission of uplink data via a non-backward-compatible component carrier that cannot transmit the PHICH in a downlink.

Figure 10:
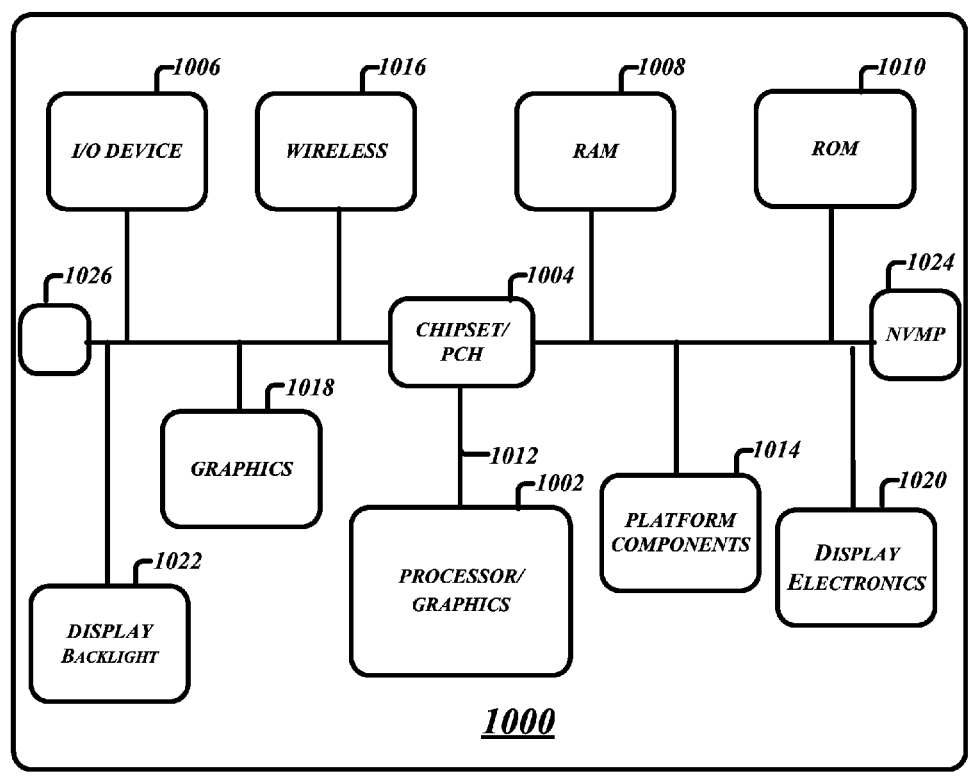
FIG. 10 is a diagram of an exemplary system embodiment.

FIG. 10 is a diagram of an exemplary system embodiment and in particular, FIG. 10 is a diagram showing a platform 1000, which may include various elements. For instance, FIG. 10 shows that platform (system) 1010 may include a processor/graphics core 1002 which may include an applications processor, a chipset/platform control hub (PCH) 1004, an input/output (I/O) device 1006, a random access memory (RAM) (such as dynamic RAM (DRAM)) 1008, and a read only memory (ROM) 1010, display electronics 1020, display backlight 1022, non-volatile memory port (NVMP) 1024, antenna 1026, and various other platform components 1014 (e.g., a fan, a crossflow blower, a heat sink, DTM system, cooling system, housing, vents, and so forth). System 1000 may also include wireless communications chip 1016 and graphics device 1018. The display electronics may include a liquid crystal display (LCD) screen, touch screen display, or other display. The I/O device 1006 may include a keyboard, mouse, and/or speakers. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores.

Figure 11:
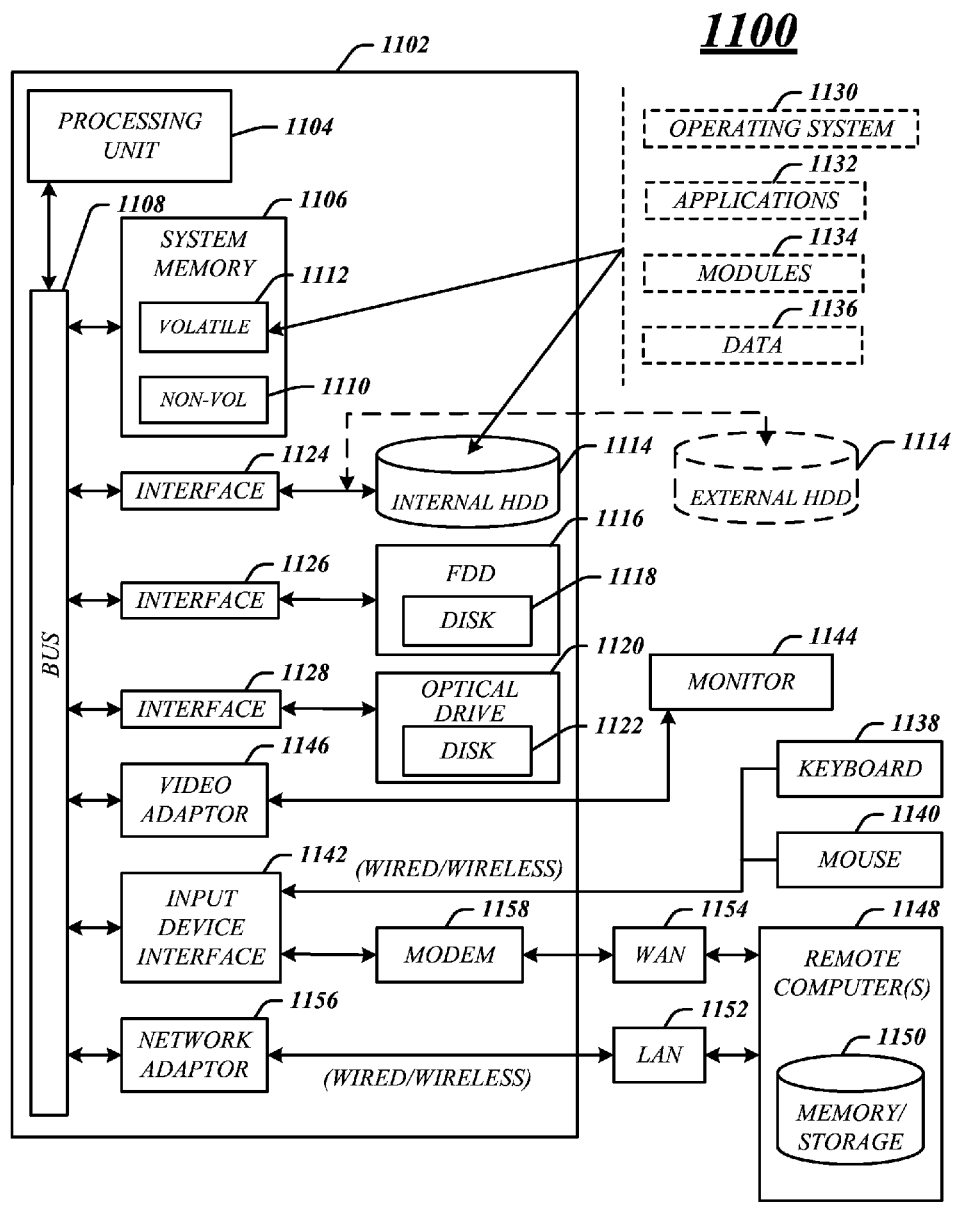
FIG. 11 illustrates an embodiment of an exemplary computing architecture.

FIG. 11 illustrates an embodiment of an exemplary computing architecture 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1194 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1194 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. User equipment (UE), comprising:
a radio frequency (RF) receiver to wirelessly receive a downlink (DL) message from an evolved node B (eNB), the DL message to allocate a non-backward-compatible component carrier to the UE;
an RF transmitter to transmit data on an uplink (UL) channel via the non-backward-compatible component carrier; and
circuitry to:
identify a backward-compatible component carrier via which to receive an acknowledgment message transmitted by the eNB in response to the transmission of the data on the UL channel;
determine a timing for receiving the acknowledgment message;
determine a physical resource block (PRB) index associated with a physical uplink shared channel (PUSCH) PRB used for transmission of the data;
apply an extended mapping rule to determine a second PRB index based on the PRB index associated with the PUSCH PRB, the extended mapping rule to map PRBs of the backward-compatible component carrier and PRBs of the non-backward-compatible component carrier to respective PRB indices comprised in a same extended range of PRB indices; and
identify, among a plurality of control channel resources of a physical hybrid automatic repeat request (HARQ) indicator channel (PHICH) of the backward-compatible component carrier, a control channel resource comprising the acknowledgment message, the control channel resource to comprise a PHICH PRB associated with the second PRB index.

2. The UE of claim 1, the acknowledgment message to comprise a hybrid automatic repeat request (HARQ) acknowledgement/non-acknowledgement (ACK/NAK) message.

3. The UE of claim 1, wherein determining the timing for receiving the acknowledgment message comprises determining a DL subframe during which to receive the acknowledgment message.

4. The UE of claim 3, the circuitry to:
identify a UL subframe during which the RF transmitter transmits the data on the UL channel; and
determine the DL subframe based on the UL subframe.

5. The UE of claim 1, comprising an antenna coupled to one or both of the RF receiver and the RF transmitter.

6. Non-transitory computer-readable storage media having stored thereon instructions that, when executed, cause user equipment (UE) to:
receive a downlink (DL) message from an evolved node B (eNB), the DL message to allocate a non-backward-compatible component carrier to the UE;
transmit data on an uplink (UL) channel via the non-backward-compatible component carrier;
identify a backward-compatible component carrier via which to receive an acknowledgment message transmitted by the eNB in response to the transmission of the data on the UL channel;
determine a timing for receiving the acknowledgment message;
determine a physical resource block (PRB) index associated with a physical uplink shared channel (PUSCH) PRB used for transmission of the data;
apply an extended mapping rule to determine a second PRB index based on the PRB index associated with the PUSCH PRB, the extended mapping rule to map PRBs of the backward-compatible component carrier and PRBs of the non-backward-compatible component carrier to respective PRB indices comprised in a same extended range of PRB indices; and
identify, among a plurality of control channel resources of a physical hybrid automatic repeat request (HARQ) indicator channel (PHICH) of the backward-compatible component carrier, a control channel resource comprising the acknowledgment message, the control channel resource to comprise a PHICH PRB associated with the second PRB index.

7. The non-transitory computer-readable storage media of claim 6, the acknowledgment message to comprise a hybrid automatic repeat request (HARQ) acknowledgement/non-acknowledgement (ACK/NAK) message.

8. The non-transitory computer-readable storage media of claim 6, wherein determining the timing for receiving the acknowledgment message comprises determining a DL subframe during which to receive the acknowledgment message.

9. The non-transitory computer-readable storage media of claim 8, having stored thereon instructions that, when executed, cause the UE to:
identify a UL subframe during which the RF transmitter transmits the data on the UL channel; and
determine the DL subframe based on the UL subframe.

10. A method, comprising:
receiving, at user equipment (UE), a downlink (DL) message from an evolved node B (eNB), the DL message to allocate a non-backward-compatible component carrier to the UE;
transmitting data on an uplink (UL) channel via the non-backward-compatible component carrier;
identifying, by circuitry of the UE, a backward-compatible component carrier via which to receive an acknowledgment message transmitted by the eNB in response to the transmission of the data on the UL channel;
determining a timing for receiving the acknowledgment message;
determining a physical resource block (PRB) index associated with a physical uplink shared channel (PUSCH) PRB used for transmission of the data;
applying an extended mapping rule to determine a second PRB index based on the PRB index associated with the PUSCH PRB, the extended mapping rule to map PRBs of the backward-compatible component carrier and PRBs of the non-backward-compatible component carrier to respective PRB indices comprised in a same extended range of PRB indices; and
identifying, among a plurality of control channel resources of a physical hybrid automatic repeat request (HARQ) indicator channel (PHICH) of the backward-compatible component carrier, a control channel resource comprising the acknowledgment message, the control channel resource to comprise a PHICH PRB associated with the second PRB index.

11. The method of claim 10, the acknowledgment message to comprise a hybrid automatic repeat request (HARQ) acknowledgement/non-acknowledgement (ACK/NAK) message.

12. The method of claim 10, wherein determining the timing for receiving the acknowledgment message comprises determining a DL subframe during which to receive the acknowledgment message.

13. The method of claim 12, comprising:
identifying a UL subframe during which the RF transmitter transmits the data on the UL channel; and
determining the DL subframe based on the UL subframe.

* * * * *